Sept. 24, 1974    P. M. SCOTT ET AL    3,838,171
DIHYDROISOCOUMARINS
Filed Oct. 30, 1972    4 Sheets-Sheet 2

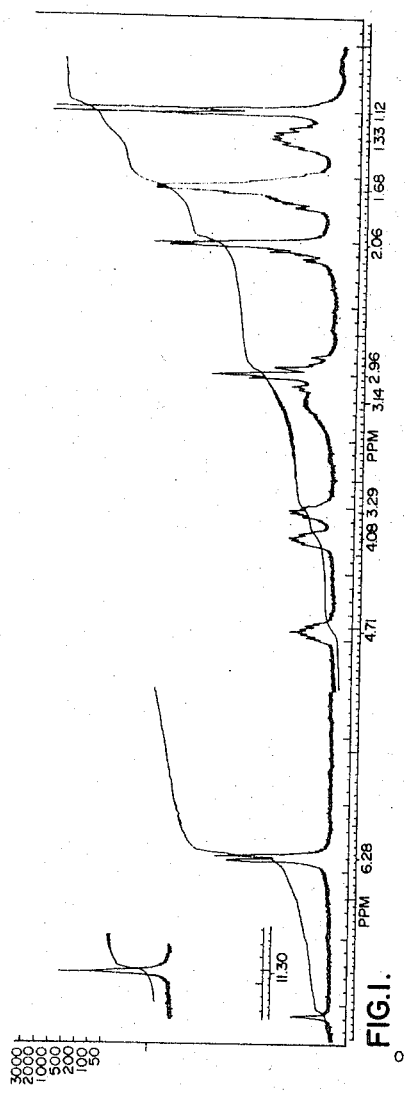
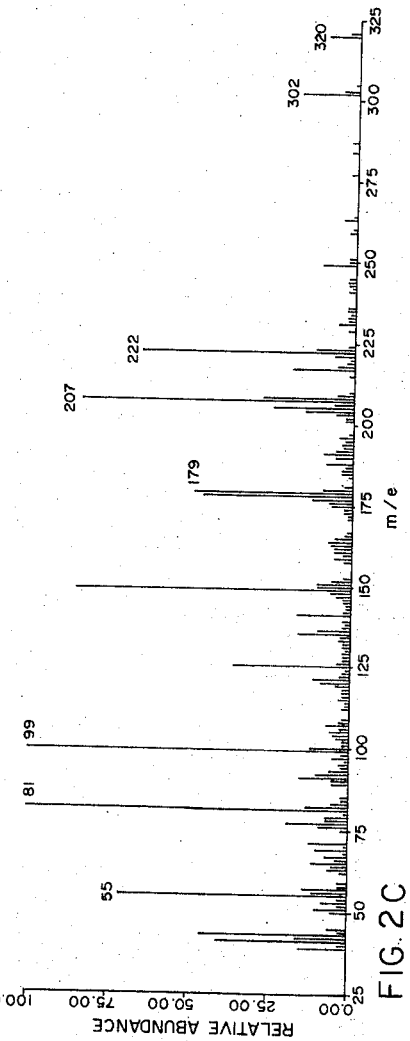
FIG. 1.
FIG. 2C

United States Patent Office
3,838,171
Patented Sept. 24, 1974

3,838,171
DIHYDROISOCOUMARINS
Peter Michael Scott and Wilhelmina van Walbeek, Ottawa, Ontario, Canada, assignors to Canadian Patents and Development Limited, Ottawa, Ontario, Canada
Filed Oct. 30, 1972, Ser. No. 301,757
Int. Cl. C07d 7/26
U.S. Cl. 260—343.2 R
4 Claims

ABSTRACT OF THE DISCLOSURE

The present invention relates to novel dihydroisocoumarins having antibiotic activity and are inter alia effective in inhibiting the growth of certain micro-organisms particularly certain species of dermatophytes and inhibiting the germination of certain species of fungi. The invention also relates to a microbiological method for the production of such dihydroisocoumarins.

The present invention relates to novel dihydroisocoumarins having antibiotic activity and a micro-biological method for their preparation. In particular the present invention relates to novel dihydroisocoumarins which are inter alia effective in inhibiting the growth of certain micro organisms particularly certain species of dermatophytes and inhibiting the germination of certain species of fungi.

According to the present invention there are provided dihydroisocoumarins of the formula:

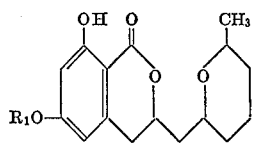

wherein $R_1$ is hydrogen, methyl or acetyl.

A particularly preferred compound is 3,4-dihydro-6,8-dihydroxy - 3 - (tetrahydro - 6 - methyl - 2H - pyran - 2-yl)methylisocoumarin which is found to be particularly effective in vitro against the protozoa and dermatophyte species Trichomonas vaginalis, Trichophyton interdigitale, Trichophyton rubrum, Trichophyton tonsurans, Microsporum canis and Epidermophyton floccosum. These five latter dermatophyte species cause ringworm of the feet, head and nails. This preferred dihydroisocoumarin compound is also particularly effective in inhibiting the growth of certain other fungal species of the general Pencillium and Aspergillus. The monoacetyl derivative has substantially similar effectiveness against the aforesaid fungal species, including the dermatophytes, and the monomethyl derivative is somewhat less effective.

The preferred compound may be prepared as a metabolite in the fermentation of the fungal species Cladosporium cladosporioides suitably in a yeast extract in sucrose nutrient medium where it appears in the mycelium only from which it is extracted suitably with hot chloroform.

According to the present invention therefore there is also provided a method of preparing the compound 3,4-dihydro - 6,8 - dihydroxy - 3 - (tetrahydro - 6 - methyl-2H - pyran - 2 - yl)methylisocoumarin which comprises culturing the fungal species Cladosporium cladosporioides in a nutrient medium and extracting the compound 3,4-dihydro - 6,8 - dihydroxy - 3 - (tetrahydro - 6-methyl-pyran-2-yl)methylisocoumarin from the mycelium so produced. To obtain the monomethyl derivative the product obtained is monomethylated at the 6-hydroxy position suitably by refluxing in acetone with methyl iodide in the presence of potassium carbonate. To obtain the monoacetyl derivative the product obtained is acetylated in the 6-hydroxy position suitably by heating with acetic anhydride.

One isolate of the fungal species Cladosporium cladosporioides useful in the process of the present invention has been deposited in the Centraalbureau voor Schimmelcultures, Baarn, Netherlands as No. CBS 452.71. The fungal species has also been deposited in the culture collection of the Northern Regional Research Laboratory, U.S. Department of Agriculture, Peoria, Ill. with accession No. NRRL 5507.

Figure 2A:
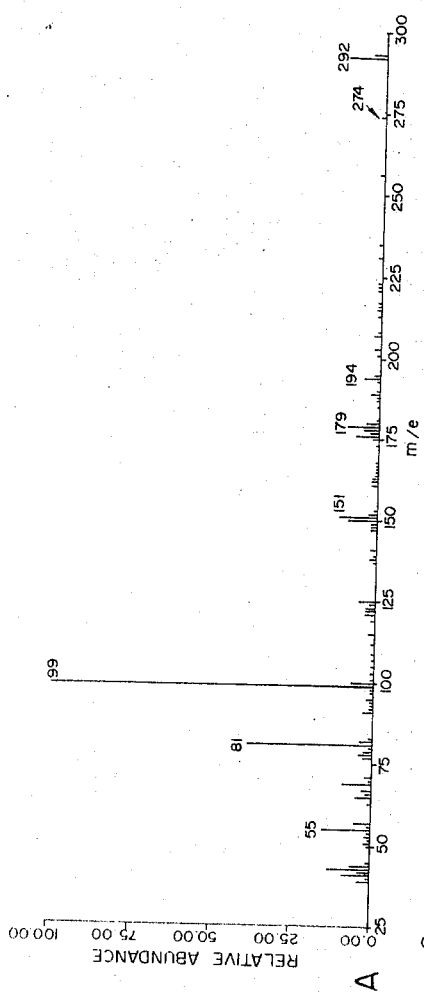
Figure 3:
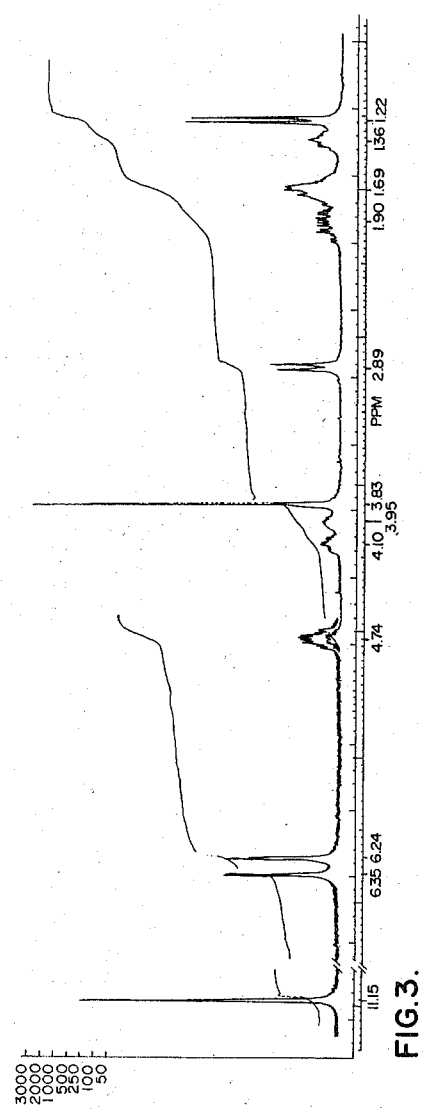
Figure 4:
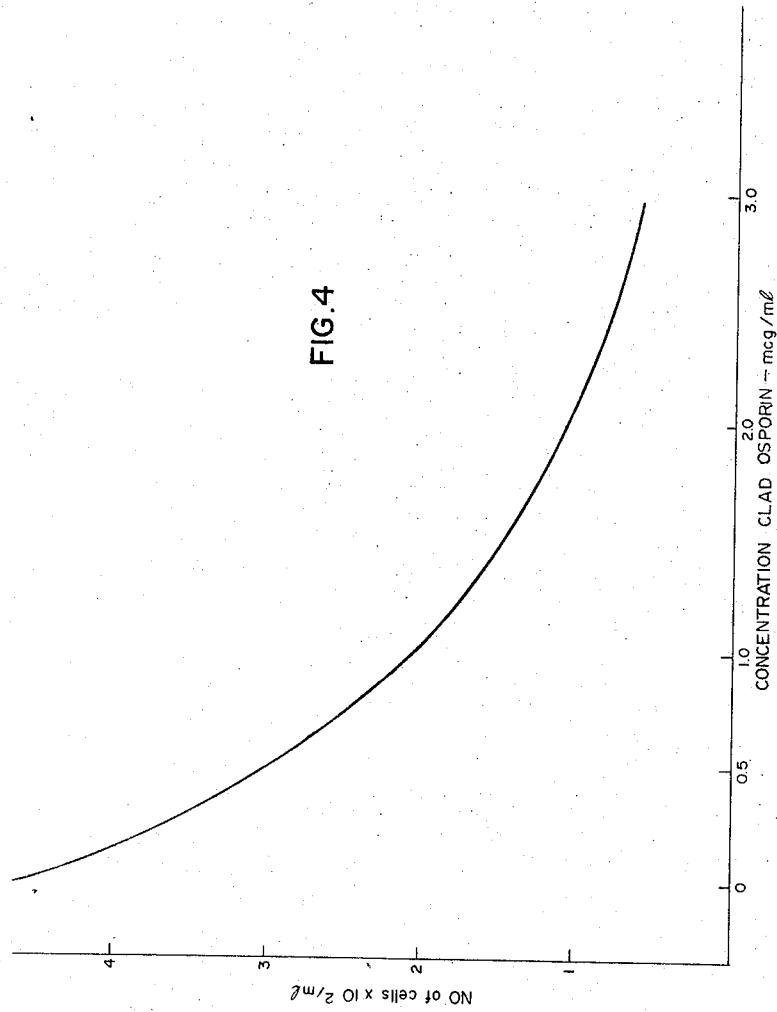

The present invention will be further illustrated by way of the following examples in which the compounds 3,4-dihydro - 6,8 - dihydroxy - 3(tetrahydro - 6 - methyl-2H-pyran-2-yl)methylisocoumarin is referred to as Cladosporin and the monomethyl, dimethyl, and monoacetyl derivatives of this compound are referred to respectively as monomethyl, dimethyl and monoacetyl cladosporin. In the accompanying drawings FIG. 1 is a 220 MHz. nuclear magnetic resonance (NMR) spectrum of cladosporin (in $CD_3COCD_3$). FIGS. 2a, b, and c are mass spectra of cladosporin (a) monomethyl cladosporin (b) and dimethyl cladosporin (c) (in which Figure m/e 149 is attributable to di- N - butyl phthalate background) FIG. 3 is a 220 MHz. (NMR) spectrum of monomethyl cladosporin (in $CDCl_3$) and FIG. 4 is a curve showing the concentrations of Trichomonas vaginalis organisms in the presence of 0 to 3 mcg./ml. of cladosporin recorded after 72 hours of incubation.

Thin-layer chromatography (TLC) was used to monitor reactions and column chromatography. Layers of Merck silica gel (0.25 mm.) were developed with toluene-ethyl acetate-90% formic acid (6:3:1) and examined under short wavelength ultraviolet light. Infrared absorption spectra were recorded with a Perkin-Elmer 257 spectrophotometer and ultraviolet absorption spectra with a Cary 14 recording spectrophotometer. Nuclear magnetic resonance (NMR) spectra were obtained with a Varian HR–220 spectrometer, Chemical shifts ($\delta$) were measured in p.p.m. downfield from $Si(CH_3)_4$. Mass spectra were recorded on Hitachi-Perkin Elmer RMU–6 or RMS–4 instruments at 70 or 80 e.v.

Production of cladosporin (I)—Example 1

Twenty 2.8-liter Fernbach flasks, each containing 200 ml. yeast extract (2%)-sucrose (15%) liquid medium, were inoculated with spore suspensions of C. cladosporioides (from a monospore culture) and incubated for 7 days at room temperature. The mycelium from each culture was heated in 200 ml. chloroform at 60° C. for 5 minutes, then soaked overnight in chloroform. Although concentration of the chloroform extracts yielded crystalline cladosporin, it was preferably purified by column chromatography. The concentrated extract (290 ml.) from 19 flasks was added to a 312 mm. x 29.5 mm. (I.D.) column of 86 g. Merck silica gel (0.05–0.2 mm. particle size). After the column had been washed with 450 ml. chloroform (fractions 1–3), 2% acetone in chloroform (fractions 4–8), and 5% acetone in chloroform (fractions 9–15). Fractions 6–12 contained most of the cladosporin (2.7 g.). Recrystallization from benzene or aqueous ethanol gave colorless needles; m.p. 188.5–189° C.;

$$[\alpha]_D^{25} -24.8°$$

(c. 0.96, ethanol); $\mu_{max}$ ($CHCL_3$); 3575, 3200 (br), 1665, 1630 cm.$^{-1}$ $\lambda_{max}$ (95% EtOH) 217, 230 (infl.), 270, 303 nm. ($\epsilon$ 20,900, 11,950, 13,030, 5,984); $\lambda_{max}$ (95% EtOH-NaOH) 242, 311 nm. ($\epsilon$ 12,000, 21,000); NMR ($CD_3COCD_3$)—see FIG. 1; mass spectrum (FIG. 2) M$^+$ 292.

Anal.
   Calcd. for $C_{16}H_{20}O_5$: C, 65.75; H, 6.90.
   Found: C, 65.73; H, 6.70.
   No nitrogen was present.

Cladosporin formed a light blue fluorescent spot at $R_f$ 0.55 after TLC. It was soluble in ethanol and ethyl acetate, moderately soluble in chloroform, slightly soluble in benzene, and insoluble in hexane and water. Cladosporin was soluble in 3 N NaOH but insoluble in 0.1 M $NaHCO_3$. Gibbs reagent (1% 2,6-dichloroquinone-4-chloroimide in ethanol, then ammonia) gave a blue color. Methanolic $FeCl_3$ gave a pale purple color changing to yellow-brown with excess reagent; no reaction product was detected by TLC.

Monomethyl cladosporin (II)—Example 2

A mixture of 159 mg. cladosporin, anhydrous $K_2CO_3$ (58 mg.), methyl iodide (1 ml.), and acetone (6 ml.) was refluxed for 46 hours with occasional addition of more methyl iodide and acetone. The solution was filtered, evaporated, and the residue purified by column chromatography on silica gel; benzene-chloroform (1:1) eluted monomethyl cladosporin which was recrystallized from methanol-water as colorless plates (94 mg.); m.p. 98–98.5° C.; $\nu_{max}$ $(CHCl_3)$ 3100 (br), 1665, 1628 cm.$^{-1}$; $\lambda_{max}$ (95% EtOH) 216.5, 227 (infl), 267, 302 nm. ($\epsilon$ 21,900, 12,510, 13,480, 5,535); $\lambda_{max}$ (95% EtOH-NaOH) 231, 237, 268, 335 nm. ($\epsilon$ 26,400, 26,100, 8,690, 7,770); NMR $(CDCl_3)$—see FIG. 3; mass spectrum (FIG. 2), M+ 306. (m/e 40, 44 and 58 are contaminants).

Anal.
   Calcd. for $C_{17}H_{22}O_5$: C, 66.65; H, 7.24.
   Found: C, 66.86; H, 7.47.

Like cladosporin, the monomethyl ether gave a positive Gibbs test and $FeCl_3$ color and was soluble in 3 N NaOH. It also formed a light blue fluorescent spot on TLC, at $R_f$ 0.80. The compound was generally more soluble in organic solvents than cladosporin.

Dimethyl cladosporin (III)

Cladosporin (141.5 mg.) was heated at 80° C. for 20 minutes with dimethyl sulfate (1 ml.) and 3 N NaOH, added as required to maintain alkalinity. The acidified reaction mixture was extracted with 4 x 3 ml. ethyl acetate. The extracts were dried, filtered, and evaporated, then purified by column chromatography on silica gel (elution with 1% acetone in chloroform, after initial chloroform wash) followed by preparative TLC on a 0.8-mm. layer of silica gel with development by benzene-acetic acid (9:1). The major deep blue fluorescent band was removed and eluted with chloroform-methanol (1:1). Recrystallization from isopropyl ether gave colorless needles of dimethyl cladosporin: m.p. 120–120.5° C. $\nu_{max}$ $(CHCl_3)$ 1709, 1605 cm.$^{-1}$; $\lambda_{max}$ (95% EtOH) 216, 225 (infl), 263, 298 nm ($\epsilon$ 24,593, 6,716, 13,483, 6,285)—unchanged on addition of NaOH-EtOH; mass spectrum (FIG. 2), M+ 320 (m/e 149, 205, and 223 are background contaminants).

Anal.
   Calcd. for $C_{18}H_{24}O_5$: C, 67.48; H, 7.55.
   Found: C, 67.60; H, 7.71.

Dimethyl cladosporin was insoluble in 3 N NaOH. It gave a deep blue fluorescent spot ($R_0$ 0.37) on TLC.

Monoacetyl cladosporin (IV)—Example 3

Cladosporin (146.5 mg.) was heated on the steam bath for 4 hours with acetic anhydride (5 ml.). Evaporation of the acetic anhydride yielded a crystalline residue, which was purified by elution with benzene-chloroform (1:1) from a silica gel column and recrystallized from n-hexane as colorless plates: m.p 127° C. $\nu_{max}$ $(CHCl_3)$ 3120 (br), 1765, 1670, 1620 cm.$^{-1}$; $\lambda_{max}$ (95% EtOH) 212, 252, 307 nm. ($\epsilon$ 28,956, 8,928, 4,815); $\lambda_{max}$ (95% EtOH-NaOH) 244, 312 nm. ($\epsilon$ 10,867, 20,330); NMR $(CD_3COCD_3)$ $\delta$ 11.30 (1 H, singlet), 6.65 (1 H, doublet, J=2 Hz.), 6.61 (1 H, multiplet), 4.82 (1 H, multiplet), 4.08 (1 H, multiplet), 3.88 (1 H, multiplet), 308 (2 H, AB part of ABX system, $J_{AB}$=16 Hz.), 2.28 (3 H, singlet), 2.15 (1 H, multiplet), 1.79 (1 H, multiplet), 1.67 (4 H, multiplet), 1.32 (2 H, 8 line multiplet), 1.13 (3 H, doublet, J=6.5 Hz.); mass spectrum 334 (M+), 316, 292, 274, 256, 236, 194, 179, 178, 176, 151, 150, 125, 99, 81, 69, 66.3 (metastable), 55, 43.

Anal.
   Calcd. for $C_{18}H_{22}O_6$: C, 64.66; H, 6.63.
   Found: C, 64.77; H, 6.75.

Monoacetyl cladosporin formed a light blue fluorescent spot on TLC at $R_f$ 0.79.

Acetylation of cladosporin with acetic anhydride and pyridine at room temperature gave, in addition to a small amount of the monoacetate, a gummy solid after separation by preparative TLC. The material formed a spot on TLC at $R_f$ 0.53 visualized by its deep blue fluorescence after spraying with conc. $H_2SO_4$. It could not be obtained crystalline but appeared to be diacetyl cladosporin: $\nu_{max}$ $(CHCl_3)$ 1770, 1720, 1615 cm.$^{-1}$; mass spectrum, 376 (M+), 334, 333, 99, 81.

Structure of cladosporin

The molecular formula of cladosporin was established as $C_{16}H_{20}O_5$ by elemental analysis and a parent ion at m/e 292 in the mass spectrum. This was confirmed by preparation of a monomethyl derivative $C_{17}H_{22}O_5$, a dimethyl derivative $C_{18}H_{24}O_5$, and a monoacetate $C_{18}H_{22}O_6$. Peaks in the ultraviolet absorption spectra of cladosporin and the monomethyl derivative closely resembled those reported for 3,4-dihydro-6,8-dihydroxy-3-methylisocoumarin and 3,4-dihydro-8-hydroxy - 6 - methoxy - 3 - methylisocoumarin in both wavelength and extinction coefficients. The spectra of both cladosporin and monomethyl cladosporin changed on addition of alkali, as expected for phenols, while the dimethyl derivative was unchanged. In monoacetyl cladosporin, the 217 and 270 nm. peaks of cladosporin were now at 212 and 252 nm., indicating the acetate was aromatic, and we obtained TLC evidence in addition to spectral indications that addition of alkali caused hydrolysis back to cladosporin.

The 3,4-dihydro-6,8-dihydroxyisocoumarin nucleus for cladosporin was supported by its infrared spectrum, which showed bands at 3575 and 3200 cm.$^{-1}$ corresponding to free and hydrogen-bonded hydroxyl groups, respectively, and a hydrogen-bonded lactone band at 1665 cm.$^{-1}$. The 3575 cm.$^{-1}$ band was absent in the infrared spectra of the monomethyl and monoacetyl derivatives and the 1665 cm.$^{-1}$ band was not shifted. Hydrogen bonding was removed in the dimethyl derivative, which had no hydroxyl bands, and the lactone band now appeared at 1709 cm.$^{-1}$.

Additional evidence for the 3,4-dihydro-6,8-dihydroxyisocoumarin part of the cladosporin molecule was obtained from the NMR spectra of cladosporin and its monomethyl and monoacetyl derivatives. The NMR spectra of cladosporin (FIG. 1), monomethyl cladosporin (FIG. 3), and monoacetyl cladosporin had signals at $\delta$11.30, 11.15 and 11.30 p.p.m. respectively, corresponding to a phenolic proton hydrogen-bonded to the peri-carbonyl group. The second phenolic proton appeared as a broad band at 3.14 p.p.m. in the spectrum of cladosporin, which was absent in the derivatives; the band moved downfield with addition of 1 drop $D_2O$ and coalesced with the HDO signal at 3.9 p.p.m. after addition of 2 more drops $D_2O$. Although at high field for a phenolic proton, such chemical shifts are not unknown, cf. reticulol possesses a phenolic hydroxyl signal at 3.40 p.p.m. in deuterated dimethylsulfoxide. The aromatic region of the NMR spectrum of cladosporin (FIG. 1) contains split signals for two protons at about 6.28 p.p.m.; the coupling constant (J=2 Hz.) is more clearly measurable in the NMR spectrum of the monomethyl derivative (FIG. 3) and is typical of meta-coupled aromatic protons. A multiplet (AB part of ABX system, $J_{AB}=16$ Hz.) at 2.96 p.p.m. (2 protons) in the cladosporin spectrum and 3.08 p.p.m. in the monoacetate is assigned to a benzylic $CH_2$ group; this group appears at 2.89 p.p.m. as a doublet in the spectrum of monomethyl cladosporin (FIG. 3). The multiplet at 4.71 p.p.m. (1 proton) in cladosporin is due to the adjacent CH(O·CO) proton at position 3. Irradiation of this peak affects the 2.96 p.p.m. multiplet (in addition to other signals), and irradiation of the corresponding 4.74 p.p.m. multiplet in monomethyl cladosporin reduces the doublet at 2.89 p.p.m. to an apparent singlet; conversely irradiation at 2.89 p.p.m. affects the 4.74 p.p.m. multiplet. Thus cladosporin is a 3,4-dihydro-6,8-dihydroxyisocoumarin substituted in the 3 position by a $C_7H_{13}O$ group.

Figure 2B:
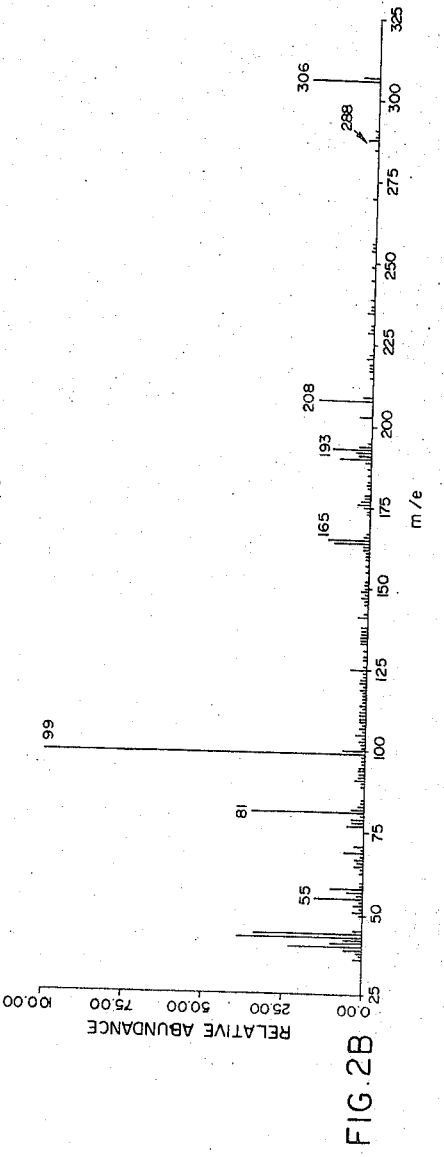

The side chain at position 3 of the dihydroisocoumarin system contains two —CHO— groups appearing as separate 1 proton multiplets at 4.08 and 3.89 p.p.m. in the NMR spectrum of cladosporin and at very similar positions in the spectra of the monomethyl and monoacetyl derivatives. Clearly these groups share the remaining oxygen atom, and as they do not correspond to epoxide methine protons, they must be part of a ring. Irradiation at 3.89 p.p.m. (3.95 p.p.m. in the monomethyl derivative) collapses the $CH_3$ doublet at 1.12 p.p.m. (1.22 in the methyl derivative) (3 protons, $J=6.5$ Hz.) to a singlet; conversely (in the monomethyl derivative), irradiation at 1.22 p.p.m. affects the 3.95 p.p.m. multiplet. The presence of a $CH_3CHOCH$ group is thus established. The nature of the cyclic moiety containing this group was apparent from the mass spectra of cladosporin and its derivatives (FIG. 2). Each mass spectrum contains common peaks at m/e 125, 99, 81, 69, 55 and 43 with a metastable peak at m/e 66.3 corresponding to loss of 18 mass units from m/e 99. The latter peak is due to a tetrahydromethylpyranyl group in which the methyl group must be in the 6 position. This leads to structure I for cladosporin. The analogous loss of water

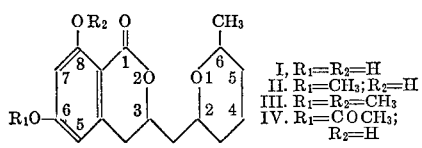

I, $R_1=R_2=H$
II. $R_1=CH_3; R_2=H$
III. $R_1=R_2=CH_3$
IV. $R_1=COCH_3;$
$R_2=H$ from the P–1 peak in the mass spectrum of tetrahydropyran has been discussed by Collin and Conde-Caprace in an article entitled "Ionization and Dissociation of Cyclic Ethers by Electron Impact," J. of Mass Spect. Ion Phys. 1: 213–225 (1968); m/e 99 (base peak) and 81 are also prominent ions in the mass spectrum of 2-(2-methyl-2-propenyl)-4-methyltetrahydropyran, which is a useful model for cladosporin.

Apart from prominent parent ions, the mass spectra (FIG. 2) of cladosporin (I), monomethyl cladosporin (II) and dimethyl cladosporin (III) also show ions attributable to loss of water (P–18), loss of tetrahydro-6-methylpyranyl with acquisition of one proton (P–98), loss of methyl from P–98 (P–113), and loss of tetrahydro-6-methylpyran-2-ylacetaldehyde (with and without aquisition of an extra proton) (P–141, P–142). The latter two processes are analogous to the loss of $CH_3CO·$ and acetaldehyde from 3,4 - dihydro - 8 - hydroxy-6-methoxy-3-methylisocoumarin and the corresponding 7-chloro compound.

Assignments of NMR chemical shifts to the remaining protons were made on the basis of decoupling experiments with cladosporin (I) and monomethyl cladosporin (II). tion of the adjacent CH(O) signal at 4.74 p.p.m. reduced this multiplet to the AB part of an ABX system and irradiation of the other adjacent CH peak at 4.10 p.p.m. also collapsed the multiplet. The methylene bridge in The two protons in the methylene bridge appear as a multiplet at 1.90 p.p.m. in the monomethyl derivative; irradiacladosporin itself appears at 2.11 p.p.m. and 1.76 p.p.m. Irradiation of either signal, at 4.10 p.p.m. and 3.95 p.p.m. due to the two CH(O) protons in the methyltetrahydropyranyl ring of monomethyl cladosporin, affects peaks at both 1.36 and 1.69 p.p.m. in addition to changes referred to earlier. Thus each ring $CH_2$ group adjacent to these CH(O) groups gives rise to signals at both 1.36 and 1.69 p.p.m. The remaining ring $CH_2$ group must have a chemical shift of 1.69 p.p.m. also. Similar assignments were deduced for the ring $CH_2$ protons in cladosporin giving signals at 1.33 and 1.68 p.p.m.

Microbiological methods (1) Media: For studies on the inhibition of spore germination by cladosporin and derivatives the liquid germination medium (LGM) (pH 6.6) described by Brian and Hemming in an article entitled Gliotoxin, a fungistatic metabolic product of *Trichoderma viride*. Ann. Appl. Biol. 32: 214–220 (1945) was employed; for growth of the microorganisms and assay of the compounds the following media were employed: tryptic soy agar (TSA) (Difco) for bacteria and yeast; Sabouraud dextrose agar (SDA) (Difco) and potato dextrose agar prepared with fresh potatoes (FPDA), according to the Difco formula, for dermatophytes and fungal plant pathogens.

(2) Compounds assayed: Solutions of cladosporin, monomethyl cladosporin, and monoacetyl cladosporin in acetone were added to the various media (acetone concentration $\leqslant 4\%$). Because of the low solubility of these compounds in water, we generally restricted their highest final concentrations in the agar test media to 75 μg./ml. and in LGM to 40 μg./ml.

(3) Spore germination method: Spore crops harvested from 7 days old culture slopes of *Aspergillus* and *Penicillium* species were suspended in LGM containing 0.025% Tween 80 and diluted with LGM to obtain $2.5 \times 10^3$ spores per ml. An improved Neubauer hemacytometer was used for counting the spores. 0.5 ml. Cups in clear sterilized Linbro "disposo trays" (Winley Morris Diagnostics, Montreal, Canada) were loaded with 0.1 ml. of each spore suspension and 0.1 ml. LGM containing the test compounds (for final concentrations, see Table 1). Tests and acetone controls were run in duplicate. The trays, lightly covered with plastic film to avoid evaporation, were incubated at 25° C., and 200 spores/cup were examined for germination with an inverted microscope at 16 and 24 hours. A spore was defined as germinated when the germ tube length exceeded half the minor diameter of the spore.

(4) Agar dilution method: The concentrations of the compounds incorporated in the agar media after autoclaving are listed in Table 2. Control media contained only the acetone solvent. A loopful of each TS broth suspension prepared from 24 hours slope cultures of bacteria and yeast were spotted on duplicate test and control plates. Inhibition of growth was recorded after 24 hours incubation at 37° C. Tufts of mycelium of dermatophytes (10 days old cultures), and plant pathogens (7 days old cultures) were point inoculated on the appropriate media and incubated at 25° C. for 6 days. On the 6th day complete inhibition of growth was verified with an inverted microscope.

Antibiotic activity of cladosporin and derivatives

Cladosporin at a concentration of 10–20 μg./ml. in LGM inhibited germination of 50% or more of the spores from 7 of the 12 strains of *Penicillium* and *Aspergillus*

TABLE 1

[Percent inhibition of spore germination, based on percent germination of control, by different concentrations of cladosporin, monoacetyl cladosporin and mono-methyl cladosporin (μg./ml.)]

| μg./ml. | Cladosporin | | | | | | | | | | | | Monoacetyl cladosporin | | | | | | | | | | | | Monomethyl cladosporin | | | |
|---|---|---|---|---|---|---|---|---|---|---|---|---|---|---|---|---|---|---|---|---|---|---|---|---|---|---|---|---|
| | 16 hours | | | | | | 24 hours | | | | | | 16 hours | | | | | | 24 hours | | | | | | 16 hours | | 24 hours | |
| | 40 | 20 | 10 | 5 | 2.5 | | 40 | 20 | 10 | 5 | 2.5 | | 40 | 20 | 10 | 5 | 2.5 | | 40 | 20 | 10 | 5 | 2.5 | | 40 | | 40 | |
| Organism: | | | | | | | | | | | | | | | | | | | | | | | | | | | | |
| *Penicillium viridicatum* 69-22 | 100 | 100 | 100 | 85 | 85 | | 95 | 65 | 65 | <50 | | | 89 | 78 | 73 | 73 | 73 | | 85 | 55 | <50 | <50 | | | | | | |
| *Aspergillus niger* 141404 U | 100 | 95 | 85 | 65 | 60 | | 95 | 85 | 70 | 70 | | | 100 | 85 | 70 | <50 | | | 78 | 56 | <50 | <50 | | | | | | |
| *P. viridicatum* 69-23 | 100 | 90 | 85 | 85 | <50 | | 100 | 95 | 55 | <50 | | | 100 | 100 | 100 | 96 | 60 | | 100 | 100 | 80 | <50 | | | 50 | 75 | | 55 |
| *P. rubrum* F3 | 100 | 95 | 80 | 60 | 60 | | 85 | 85 | 75 | <50 | | | 93 | 88 | 76 | 76 | 76 | | | | | | | | | | 74 | |
| *A. ochraceus* 66-87 | 99 | 97 | 77 | 61 | <50 | | 75 | <50 | | | | | 85 | 75 | <50 | <50 | | | <50 | | | | | | | | | |
| *A. versicolor* IMI 49124 | 95 | 70 | 55 | <50 | | | 95 | 60 | 85 | 85 | 75 | | 84 | 67 | 67 | 96 | 96 | | 60 | 60 | 60 | <50 | | | 74 | 89 | | <50 |
| *P. expansum* H71 | 85 | 85 | 75 | <50 | | | | <50 | <50 | | | | 100 | 100 | 96 | | | | <50 | 92 | 92 | 92 | 80 | | 75 | 50 | 75 | <50 |
| *A. flavus* V 71 | 85 | 65 | 60 | 55 | <50 | | | <50 | <50 | <50 | | | 84 | 67 | <50 | | | | <50 | | | | | | | | | |
| *A. versicolor* IMI 16139 | <50 | <50 | | | | | | | | | | | 68 | 62 | <50 | | | | <50 | | | | | | | | | |
| *P. viridicatum* W70-63 | 75 | 65 | <50 | | | | | | | | | | 100 | 100 | 84 | 60 | <50 | | 78 | 56 | <50 | | | | 73 | 65 | | 50 |
| *A. clavatus* W70-33 | 75 | <50 | | | | | 75 | 65 | 55 | <50 | | | 100 | 97 | 84 | 84 | | | 100 | 98 | 90 | 70 | 60 | | | | | <50 |
| *A. nidulans* W-70-119 | 55 | <50 | | | | | <50 | | | | | | <50 | | <50 | | | | <50 | | <50 | | | | <50 | <50 | | |

TABLE 2

[Effect of cladosporin and its monomethyl and monoacetyl derivatives on dermatophytes, plant pathogens, bacteria, and yeast]

| Organism | Medium | Days | M.I.C. (μg./ml.) | | |
|---|---|---|---|---|---|
| | | | Cladosporin | Monomethyl cladosporin | Monoacetyl cladosporin |
| *Trichophyton interdigitale* | SDA, FPDA | 6 | 75 | >75 | 75 |
| *T. rubrum* | SDA, FPDA | 6 | 75 | >75 | 75 |
| *T. tonsurans* | SDA, FPDA | 6 | 75 | >75 | 75 |
| *Microsporon canis* | SDA, FPDA | 6 | 75 | >75 | >75 |
| *Epidermophyton floccosum* | SDA, FPDA | 6 | 75 | >75 | >75 |
| *Botrytis cinerea* | SDA, FPDA | 6 | >75 | >75 | >75 |
| *Rhizoctonia solani* | SDA, FPDA | 6 | >75 | >75 | >75 |
| *Stemphylium radicinum* | SDA, FPDA | 6 | >75 | >75 | >75 |
| *Escherichia coli* | TSA | 1 | >75 | >75 | >75 |
| *Bacillus subtilis* | TSA | 1 | >75 | >75 | >75 |
| *Bacillus cereus* | TSA | 1 | >75 | >75 | >75 |
| *Staphylococcus aureus* | TSA | 1 | >75 | >75 | >75 |
| *Staphylococcus epidermidis* | TSA | 1 | >75 | >75 | >75 |
| *Micrococcus flavus* | TSA | 1 | 40 | 75 | 75 |
| *Saccharomyces cerevisiae* | TSA | 1 | >75 | 75 | >75 | tested after 24 hours (Table 1). Spores of *A. niger* were swollen an average of 37% more than controls in the presence of 75 μg./ml. cladosporin, and where germination occurred, tubes were wide and distorted. Of the various microorganisms against which cladosporin was tested, *Micrococcus flavus* appeared to be the most sensitive (Table 2). At 75 μg./ml. cladosporin inhibited the growth of five dermatophytes, belonging to three different genera, and the plant pathogen *Rhizoctonia solani*.

The activity of monoacetyl cladosporin closely paralleled that of cladosporin (Tables 1 and 2), and while it did not inhibit the growth of *Microsporon canis* or *R. solani*, it did restrict the growth of these organisms to approximately one quarter and one twentieth, respectively, of the diameters of the corresponding control cultures. Monomethyl cladosporin was the least active of the 3 compounds tested, and inhibited germination at >50% of the spores from only 3 of the fungi tested at a concentration of 40 μg./ml. However, it alone inhibited the growth of *Saccharomyces cerevisiae* (Table 2).

The effect of cladosporin against *Trichomonas vaginalis in vitro* was ascertain. The strain of *Trichomonas vaginalis* had been previously stabilized in liquid nitrogen for eleven years and these organisms grow luxuriantly in an axenic culture system yielding populations of several millions of cells per ml of medium in 24 hours.

An initial solution of cladosporin was made in alcohol. A subsequent dilution was made in water and added to the culture medium to give the required final concentrations of the antibiotic. The solvents in the concentrations employed had no effect on the growth of the organisms. As a result of several tests the critical concentration of cladosporin against *T. vaginalis* was found to be between 4 and 5 mcg./ml. In the presence of 5 mcg./ml. of cladosporin after 48 hours of cultivation there were a few motile trichomonads (the majority being rounded and non-motile), but when they were transferred to antibiotic-free medium they failed to grow. With more than 5 mcg./ml. all the organisms were dead after 24–48 hours. In the presence of 4 mcg./ml. the trichomonads appeared normal and were motile after 72 hours of incubation (although in smaller numbers than in controls and in cultures with lower concentrations of cladosporin), and when transferred to normal medium, produced a rich culture after 96 hours.

FIG. 4 is a curve showing the concentrations of the organisms in the presence of 0 to 3 mcg./ml. of cladosporin recorded after 72 hours of incubation.

Cladosporin was then tested for estrogenic activity. Using 2 mg. total dose given over a period of five days to Holtzman white, virgin 21 days old weanling rats in a balanced ration, it was found that no estrogenic activity or other apparent toxic action occurred as will be seen from the following table.

TABLE 3

| | Start | Termi-nate | Initial wt., g. | Term wt., g. | Feed consumed., g. | Uterus wt., mg. |
|---|---|---|---|---|---|---|
| *2 mg. cladosporin used* | | | | | | |
| Rat 1 | 5/11 | 5/16 | 52 | 73 | 40 | 43 |
| Rat 2 | 5/11 | 5/16 | 57 | 78 | 50 | 42 |
| Rat 3 | 5/11 | 5/16 | 58 | 81 | 50 | 46 |
| Avg | | | | | | 44± |
| *Control rats* | | | | | | |
| Rat 1 | 5/11 | 5/16 | 51 | 76 | 45 | 60 |
| Rat 2 | 5/11 | 5/16 | 59 | 83 | 45 | 62 |
| Avg | | | | | | 61 |

Toxicity studies showed that claospirin is not toxic to mice at a dose of 400 mg./kg. by intraperitoneal injection (suspension in gum tragacanth).

The embodiments of the invention in which an exclusive property or privilege is claimed are defined as follows:

1. A compound of the formula

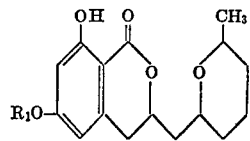

wherein $R_1$ is hydrogen, methyl or acetyl.

2. A compound as claimed in Claim 1 which is 3,4-dihydro - 6,8 - dihydroxy - 3 - (tetrahydro-6-methyl-2H-pyran-2-yl)methylisocoumarin.

3. A compound as claimed in Claim 1 which is 3,4-dihydro-8-hydroxy - 6 - methoxy - 3 - (tetrahydro-6-methyl-2H-pyran-2-yl)methylisocoumarin.

4. A compound as claimed in Claim 1 which is 3,4-dihydro-8-hydroxy - 6 - acetyloxy - 3 - (tetrahydro-6-methyl-2H-pyran-2-yl)methylisocoumarin.

References Cited
UNITED STATES PATENTS
3,551,455   12/1970   Girotra et al. _____ 260—343.2

JOHN M. FORD, Primary Examiner

U.S. Cl. X.R.

424—279; 195—81